Nov. 16, 1965   P. PUSCH ETAL   3,218,018
LOAD CARRYING HOOK AND METHOD OF MAKING THE SAME
Filed Oct. 9, 1963   2 Sheets-Sheet 1

Inventor:
PAUL PUSCH and
HORST PÖHL
By: McGlew and Toren
Attorneys

Nov. 16, 1965    P. PUSCH ETAL    3,218,018
LOAD CARRYING HOOK AND METHOD OF MAKING THE SAME
Filed Oct. 9, 1963    2 Sheets-Sheet 2

Inventor:
PAUL PUSCH and
HORST PÖHL
By: McGlew and Toren
Attorneys 3,218,018
LOAD CARRYING HOOK AND METHOD
OF MAKING THE SAME
Paul Pusch, Holunderweg 25, Berlin-Spandau, Germany
and Horst Pöhl, Cambridger Strasse 27, Berlin N. 65,
Germany
Filed Oct. 9, 1963, Ser. No. 315,008
Claims priority, application Germany,
Oct. 31, 1962, P 30,489
2 Claims. (Cl. 248—340)

This invention relates in general to the construction of a load bearing hook and method of making the same, and in particular to a new and useful sliding meat hook having a hook guide portion which is in the form of an open eyelet with bearing surfaces formed on the interior of the eyelet of a construction and arrangement for facilitating the sliding of a hook over a flat rail carrier.

The present invention is particularly applicable to the construction of hooks which are suitable for use in butcher shops, slaughtering plants, refrigeration plants and the like and which permit the sliding of the hook on a flat rail even when the hook carries a heavy load. In a hook construction of this character, since the hook carrying portion projects outwardly relative to a hook guiding portion, the load acting on the hook at a distance from a guide causes a turning or a twisting momentum or torque tending to rotate the whole hook about its guiding support. In addition, there is a tendency for the hook to angle off or tilt when attempts are made to slide it and this is particularly so when the hook is loaded. Due to the friction at the side surfaces of the hook guide and the friction of the supporting rail, the hook will easily be damaged along its side faces during sliding when the hook is carrying a heavy load. This causes the formation of grooves or flutes on the exposed surfaces of the hook. The deterioration of the hook sliding surfaces in this manner causes it to be even more difficult to slide the hook subsequently.

It is already known to guide hooks of this character on rollers or to provide rollers on the side surfaces of either the hook or the rail and to provide similar guiding means on either the hook or its supporting rail to facilitate sliding of a loaded hook. The known measures are not sufficient since they do not improve the guiding or gliding capacity of the hook on the rail. In addition, they are expensive and require an expense in maintenance.

In accordance with the invention there is provided a hook which is adapted to slide on a flat rail and which includes a hook guide portion in the form of an open eyelet formed by two leg portions and a connecting web. The interiors of the leg portions and web constitute glide tracks, which are adapted to bear against the sides and top, respectively, of the supporting rail and are made of a synthetic material suitable as a bearing material and formed in a manner to facilitate the sliding of the hook. In a preferred form the glide tracks which are formed by the interior surfaces of the leg and web portions of the guide of the hooks are constructed so that their outer or bearing surface is arched transversely to the center plane of the hook. In particular the web portion which forms the upper bearing surface which is adapted to bear down on the supporting rail is made slightly convex so that the hook, even if it is moved so that it becomes displaced obliquely during sliding, will glide without standing on edge.

In a preferred construction, the glide tracks are made of a synthetic material such as a thermo-plastic resin, for example Teflon, Delrin, or the like, which can be molded under pressure and heat, and which exhibit good sliding or gliding properties. Such material is preferably one which will glide easily over a metal carrier rail and which will not require any lubrication.

A particularly advantageous embodiment of the invention comprises a construction in which a hook is made of the same synthetic material as the glide tracks and contains a core which has the shape of the guiding portion of the hook as well as the hook portion and which core is surrounded by the synthetic material.

The embedding of the core within the synthetic material is desired in the event that the sliding hook has to carry very heavy loads, sometimes up to several hundred pounds. In such a construction the core is present both in the hook portion and also in the guide portion so that the hook cannot break at areas of dangerous cross section even when subjected to great loads.

In order to have particularly great carriage capacity, the core is made of a rectangular cross section and is arranged in the hook so that in respect to sections taken at the web and the hook portion the longest dimension of the rectangular cross section extends vertically. The core itself is made of a steel plate the strength of which is adapted to the cross section of the hook. In the case of small so-called "pig" hooks it is sufficient if the hook is made of steel wire which has a circular cross section. Of course, it is possible in the event of such small hooks to use a core of rectangular cross section.

A hook constructed according to the present invention is particularly adapted for use in slaughtering houses and refrigerating plants since the carrying capacity of such hooks is unlimited and they can support large pieces of cattle.

Furthermore the hooks have the advantage that they are unobjectionable from a hygienic point of view and are corrosion-resistant without requiring any special surface treatment.

During the manufacture of the gliding hooks the core of metal is made of a size such that a portion thereof will project relative to the hook guiding portion by an amount permitting it to be manipulated and mounted in the mold outside the overall hook profile. This projecting portion is then cut off from the finished injected hook and the cut surface of the core is finally covered by a cap of synthetic material. It is preferable to coat the cut surfaces of the core with a solution of a synthetic material.

Accordingly it is an object of the present invention to provide a hook having guiding surfaces which facilitate the sliding of a hook on a flat rail carrier or support.

A further object of the invention is to provide a method of forming a hook having a metal core with a synthetic coating.

A further object of the invention is to provide an improved hook construction including a guide portion formed as an open eyelet with leg portions connected by a central web, the guide portion adapted to be positioned on a carrier rail in bearing engagement therewith and being formed of a material and of a construction to facilitate sliding of the hook over the carrier rail.

A further object of the invention is to provide an improved hook construction which comprises a hook portion and a guide portion formed as an open eyelet for supporting the hook on a carrier rail, the interior of the guide portion being formed of a synthetic material and having transversely curved surfaces for facilitating sliding of the hook along the carrier rail.

A further object of the invention is to provide a hook construction which is simple in design, rugged in construction and economical to manufacture.

The various features of novelty which characterize the invention are pointed out with particularity in the claims annexed to and forming a part of this specification. For a better understanding of the invention, it operating advantages and specific objects attained by its use, reference should be had to the accompanying drawings and descriptive matter in which there are illustrated and described preferred embodiments of the invention.

Figure 3:
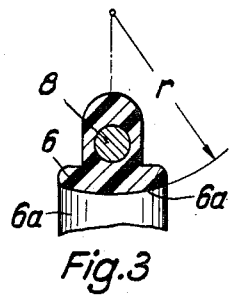
FIG. 3 is a section taken on the line III—III of FIG. 1.
Figure 4:
FIG. 4 is a section taken on the line IV—IV of FIG. 1.
Figures 1, 2:
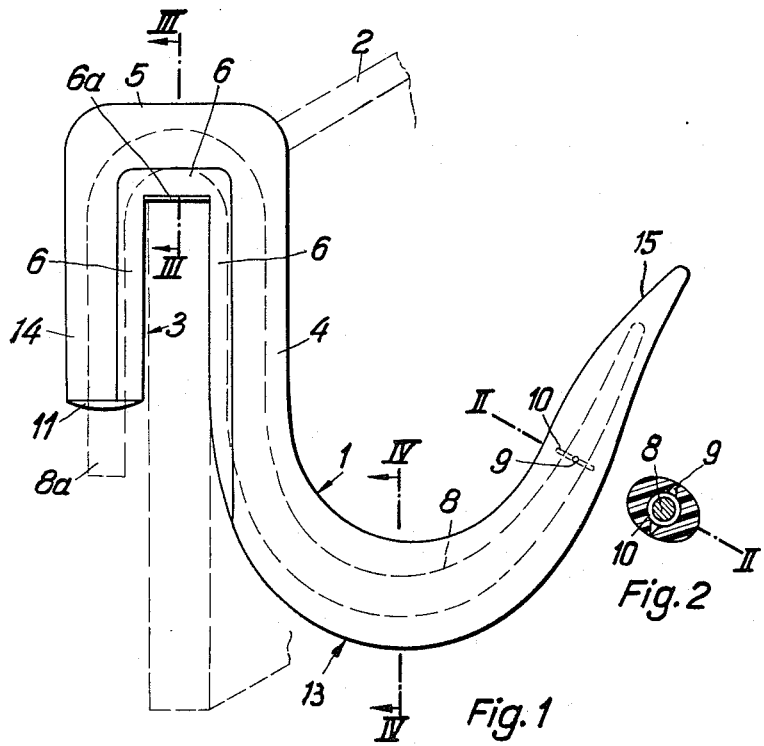
FIG. 1 is a side elevation of a hook constructed in accordance with the invention indicated supported on a carrier rail which is shown in dotted lines.
FIG. 2 is a section taken on the line II—II of FIG. 1.

Referring to the drawings in particular, the invention embodied therein in FIGS. 1 to 4 comprises a so called pig hook generally designated 1 which is adapted for relatively small loads. The hook 1 is indicated suspended on a flat carrier rail 2, the carrier rail being supported in an on-edge manner. The hook 1 comprises a hook guide portion generally designated 3 and a curved hook or load-supporting portion generally designated 13. In accordance with the invention the hook guide portion comprises two substantially parallel legs, a front leg 4 and a rear leg 14. The legs 4 and 14 are connected by a top portion or web 5. The complete interior of the guide 3 is formed as a glide track (or tracks) 6 which is made of suitable synthetic material. The glide track 6 is preferably formed as an integral portion of the hook 1 or may in some instances be made as a separate portion which is permanently secured at the location of the interior of the hook guide 3. The glide track 6, when formed as an independent constructional part or unit, is rigidly connected with the hook proper by rivets or screws or by adhesive or clamping or the like. In the illustrated embodiment the entire hook, including the hook guide portion 3 and the glide track 6, is made from synthetic material which is suitable for a glide track. The glide track 6 is preferably made wider than the hook portion 13 and the remaining portion of the hook guide 3 and the outer or bearing surfaces thereof are made curved in a transverse direction and preferably are slightly convexly arched. In FIG. 3 the arching radius is indicted by r and the surfaces corresponding to the arching radius are indicated by 6a. As indicated in FIGS. 2, 3 and 4, the hook, including the hook guide portion 3 and the curved hook portion 13, contains a core 8 which, in the region of the hook tongue or tip 15, is pointed. In the vicinity of the tongue 15 the core carries spacers 9, as indicated in FIG. 2, for centering purposes which are arranged at a ring 10 in diametrically opposing manner. By the use of the spacers the core 8 is centered in a mold and the core is clamped within the mold at the location of an extending part 8a which is indicated in dotted lines in FIG. 1. While the core is still held, the exterior surface is formed over the complete hook configuration. After the hook is removed from the mold, the projecting portion indicated in dotted lines 8a is cut off and the cut surface of the core 8 is then covered, for example, by a cap 11 of synthetic material.

Figure 6:
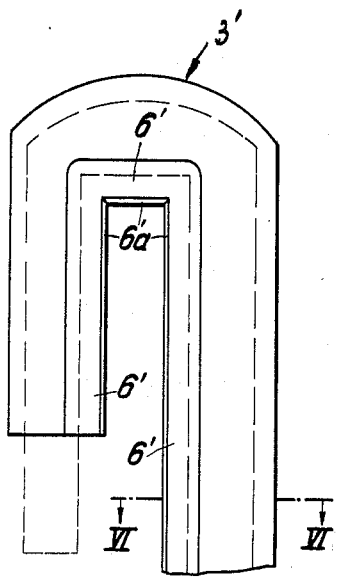
FIG. 6 is a section taken on the line VI—VI of FIG. 5.
Figure 6:
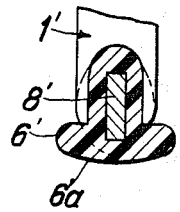
Figure 7:
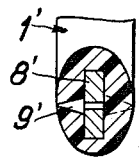
FIG. 7 is a section taken on the line VII—VII of FIG. 5.
Figure 5:
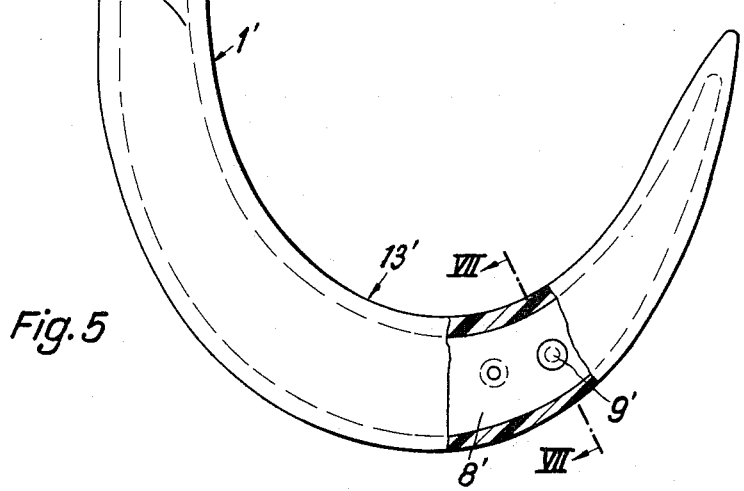
FIG. 5 is a side elevation of another embodiment of the invention.

With so called pig hooks of the type indicated 1 in FIGS. 1–4 it is sufficient to produce the core 8 of a steel wire having a circular cross section. A more heavy embodiment of the hook which, for example, is suitable for holding cattle, is indicated in FIG. 5. In this embodiment a core 8' is made of steel sheet metal from which the core is either cut or punched and which corresponds to the complete shape of the hook generally designated 1'. In this embodiment the core has a rectangular cross section of a thickness adapted to the overall hook cross section. The core 8 is arranged so that the longest dimension will be substantially vertical in respect to a section taken as indicated in FIG. 7. The interior surface of the guiding portion 3' is made of synthetic material to form gliding tracks 6' which is of a curved configuration, as indicated at 6a in FIG. 6. A hook of this construction can hold loads in excess of several hundred pounds. The excellent gliding properties of the synthetic material which forms the gliding track 6' insures that the hook can be easily slid along the rail 2, even when it is heavily loaded. Spacers 9' are advantageously riveted in the sheet metal core 8' at the two areas indicated in FIG. 5.

While specific embodiments of the invention have been shown and described in detail to illustrate the application of the inventive principles, it will be understood that the invention may be embodied otherwise without departing from such principles.

What is claimed is:

1. A meat hook capable of being slid along a flat carrier rail, comprising a curved hook portion and a hook guide portion for positioning the hook portion over a carrier rail, said hook guide portion being defined by legs adapted to bear against opposite sides of a carrier rail, which legs are connected by a central web adapted to bear downwardly on a top of the carrier rail, said entire meat hook being formed with a central core of rigid metal material and a thick outer cover of synthetic material over the entire said central core, said central core having a rectangular cross section and being arranged with the longest dimension disposed vertically with respect to a vertical cross section through said web when said hook is in an operating position on a carrier rail, said hook guide portion having curved surfaces which are adapted to bear directly on a carrier rail.

2. A meat hook capable of being slid along a flat carrier rail, comprising a curved hook portion and a hook guide portion for positioning the hook portion over a carrier rail, said hook and guide portion being defined by substantially parallel legs adapted to bear against opposite sides of a carrier rail, said legs being connected by a central web adapted to bear downwardly on the top of a carrier rail, said hook portion and said hook guide portion having a central rigid metal core of substantially rectangular cross section and an exterior layer of plastic material covering the entire said central metal core for facilitating the gliding movement of the hook along a carrier rail and for protecting the hook, said guide portion having a curved surface adapted to bear directly on a carrier rail.

References Cited by the Examiner

UNITED STATES PATENTS

| | | | |
|---|---|---|---|
| 1,918,505 | 7/1933 | Wallenberg | 264—275 |
| 2,326,828 | 8/1943 | Camp | 29—180 |
| 2,705,816 | 4/1955 | Sampson | 264—275 |
| 2,904,300 | 9/1959 | Kirk | 248—340 |
| 2,999,276 | 9/1961 | Morin | 264—275 X |
| 3,018,004 | 1/1962 | Nesbitt | 248—301 X |
| 3,076,664 | 2/1963 | Baird | 211—113 X |
| 3,090,999 | 5/1963 | Karns | 264—275 |

FOREIGN PATENTS 164,442  11/1949  Austria.
618,717   9/1935  Germany.

CLAUDE A. LE ROY, *Primary Examiner.*